United States Patent [19]
Beisch

[11] 3,798,728
[45] Mar. 26, 1974

[54] METHOD OF MANUFACTURING WHEEL TRIM

[75] Inventor: Hans R. Beisch, Essex, Ontario, Canada

[73] Assignee: Sargent Industries of Michigan, Inc., Ypsilanti, Mich.

[22] Filed: Apr. 4, 1972

[21] Appl. No.: 240,970

[52] U.S. Cl. ........ 29/159 A, 113/116 E, 113/116 R, 301/37 R, 301/37 TP, 301/37 T, 301/37 CD
[51] Int. Cl. ....... B21d 53/26, B21k 1/28, B21k 1/42
[58] Field of Search .................... 29/159 A, 159 R; 113/116 E, 116 R; 301/37 R, 37 TP, 37 C, 37 T, 37 CD

[56] References Cited
UNITED STATES PATENTS

| R22,410 | 12/1943 | Lyon | 301/37 T |
|---|---|---|---|
| 2,420,320 | 5/1947 | Lyon | 301/37 R |
| 2,431,338 | 11/1947 | Lyon | 301/37 R |
| 3,001,496 | 9/1961 | Lyon | 29/159 A X |
| 3,006,691 | 10/1961 | Lyon | 29/159 A X |
| 3,025,818 | 3/1962 | Lyon | 113/116 E |
| 3,025,819 | 3/1962 | Lyon | 113/116 E |

*Primary Examiner*—Charles W. Lanham
*Assistant Examiner*—Victor A. DiPalma
*Attorney, Agent, or Firm*—Harness, Dickey & Pierce

[57] ABSTRACT

This application discloses an improved method of manufacturing trim rings for automotive wheels from a single strip of sheet material, comprising generally forming a flat strip of material into a hooped configuration, attaching the two ends of the hoop, expanding the hoop around the perimeter thereof intermediate the opposite axial ends thereof, and separating the hoop into a pair of trim rings.

38 Claims, 8 Drawing Figures

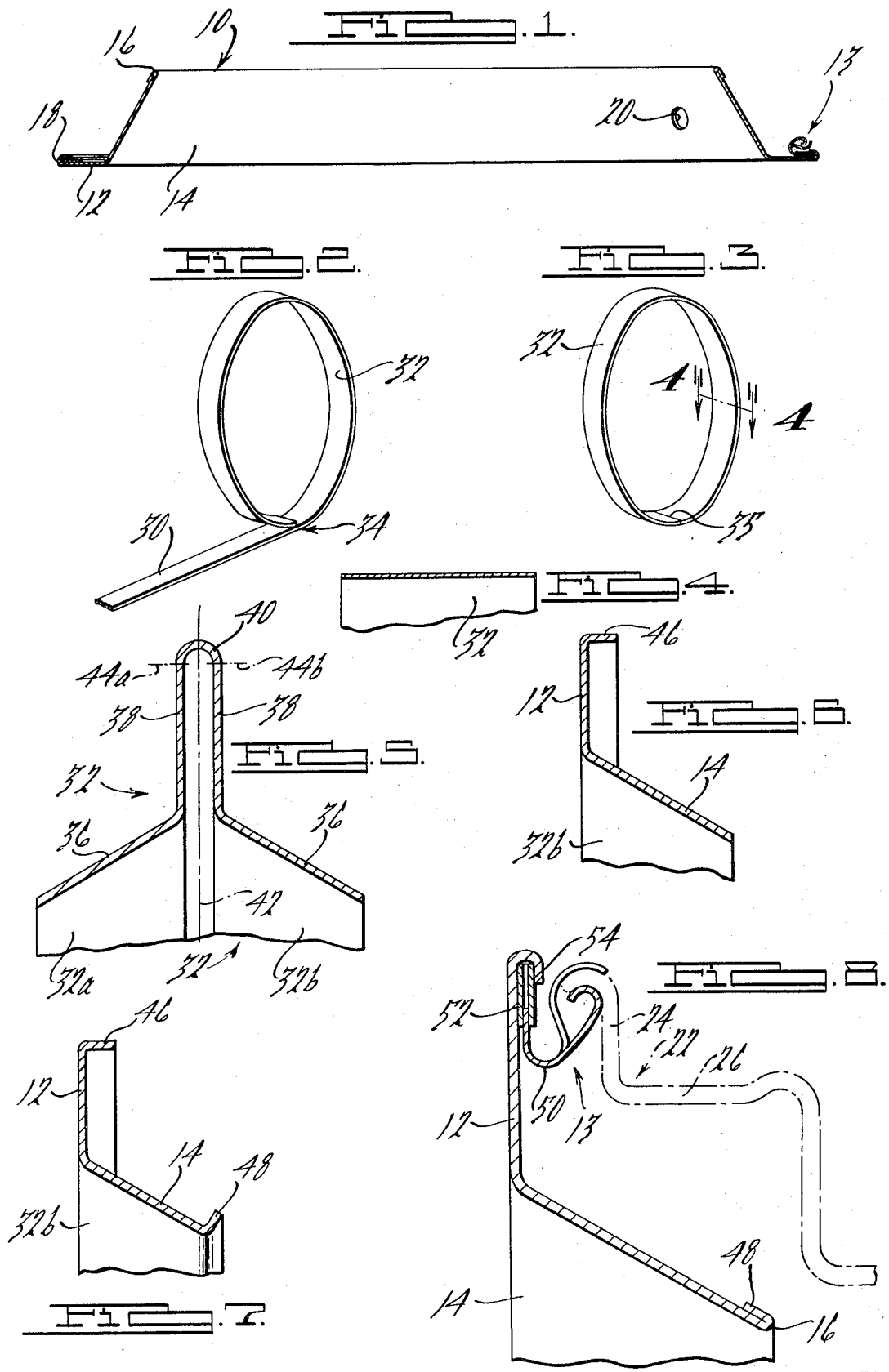

METHOD OF MANUFACTURING WHEEL TRIM

BACKGROUND AND SUMMARY OF THE INVENTION

Generally speaking, the function of automotive wheel trim is to decorate and/or protect the automotive wheel, and one of the major problems in the design of a commercially successful article of wheel trim concerns meeting the desired objectives of appearance, protection, location and retention in an article or trim which may be economically mass produced.

It is therefore the primary object of the present invention to provide an improved method of manufacture of wheel trim, and particularly a trim ring meeting these objectives, which method is especially economical because a minimum of raw material is consumed, scrap being minimal, welded seams are straight and therefore easy to weld and finish, and because conventional manufacturing equipment and techniques may be utilized.

These and other objects, features and advantages of the present invention will become apparent from the subsequent description and the appended claims, taken in conjunction with the accompanying drawings.

BRIEF DESCRIPTION OF THE DRAWINGS

FIG. 1 is a transverse sectional view of a trim ring of the type which may be manufactured by the method of the present invention;

FIGS. 2 and 3 are perspective views illustrating initial steps in the fabrication of a trim ring from a flat strip of material in accordance with the principles of the present invention;

FIG. 4 is a fragmentary transverse sectional view taken along the line 4—4 in FIG. 3; and FIGS. 5, 6, 7 and 8 are fragmentary transverse cross-sectional views similar to FIG. 4 illustrating successive additional steps in the formation of a trim ring in accordance with the principles of the present invention, FIG. 8 being somewhat enlarged and showing in phantom a section of a conventional automotive wheel.

DETAILED DESCRIPTION OF THE PREFERRED EMBODIMENT

The method of the present invention is applicable to automotive wheel trim generally, however because of the utilization of raw material in relatively narrow strip form it is particularly suited to the manufacture of trim rings, and the present invention is therefore described as embodied in a trim ring method of manufacture. The principles of the present invention, however, may be readily applied to a wheel cover, i.e., a device also covering the entire center portion of an automotive wheel, by the addition of a suitable ornamental and/or protective element, medallion or the like to the open center portion of the trim ring, using techniques well known to those skilled in the art.

Referring more particularly to the drawings, there is illustrated in FIG. 1 a trim ring 10 for an automotive wheel. Trim ring 10 consists generally of an outer peripheral flange 12 adapted to overlie the outer peripheral rim of an automobile wheel, wheel locating and retention means shown generally at 13, a major central portion 14, an inner peripheral edge 16 and an outer peripheral edge 18. A valve stem hole 20 is provided through central portion 14. Trim ring 10 is generally conical in overall configuration, however the entire configuration of the cross-section and outer face of the trim ring shown is purely exemplary and may be varied for any particular application. When referring herein to the cross-sectional configuration of the trim ring reference is being made to the shape of the material as viewed in a section taken in a plane extending from and including the center axis of the ring and passing through the ring at a single place.

As can be seen in FIG. 8, when the trim ring of the present invention is affixed to a conventional automotive vehicle wheel, such as indicated in phantom at 22, outer peripheral flange 12 axially overlies the outer flange or rim 24 of the wheel, and central portion 14 overlies the intermediate flange 26 of the wheel, being primarily radially inwardly and slightly axially outwardly disposed with respect thereto. Wheel 22 is of conventional construction and as partially shown in FIG. 8 its center axis or axis of rotation (not shown) extends horizontally in the plane of the drawing below the figure shown.

The method of fabrication of the present invention is set forth below, with particular reference to FIGS. 2–8. As shown in FIG. 2 the input raw material 30 is in the form of a relatively narrow strip of stainless steel or other material having desirable decorative and protective characteristics and suitable for appropriate finishing. Strip 30 is preferably of a width slightly greater than twice the developed length of the cross-sectional shape of the finished trim ring. The first operation is to form strip 30 into a generally cylindrical hoop of desired diameter, as shown at 32 in FIG. 2, and to sever the hoop from the remainder of the strip, as at 34. Alternatively, the strip can be precut into predetermined lengths prior to being formed into a hoop. The hoop is preferably of a diameter slightly less than the inside diameter of the finished trim ring. The resulting adjacent free ends of the hoop are then welded together, as at 35, to form a continuous substantially cylindrical hoop such as shown in FIG. 3. Convention welding techniques may be used, such as shielded arc welding, (including T.I.G. and M.I.G. arc welding, plasma arc welding, and the like), mash lap seam welding, electron beam welding, laser welding, or the like. The welding is preferably done in such a way as to make the seam as unnoticeable as possible, particularly on the inside surface of the hoop. T.I.G. arc welding is believed to yield the best quality weld for its cost in this application and is therefore preferred. At this point, i.e., while the material still has a flat cross-section, the seam may be easily finished or smoothed, such as by plannishing, grinding or the like, if such finishing is necessary or desired.

Hoop 32 is thereafter expanded into the symmetrical cross-sectional configuration illustrated in FIG. 5, comprising oppositely directed generally axially extending flanges 36 interconnected by radial flanges 38 joined by bight portion 40. This expansion may be performed by a rolling operation on a conventional rotary roll forming machine, or by a press operation using conventional cam dies, or a rubber or polyurethane expansion medium, in accordance with known principles. The hoop is then separated along broken line 42 in FIG. 5 into two substantially identically shaped hoops 32a and 32b. This separating may be done in the roll forming machine if the shape is rolled or in the press if the shape is formed in a press, using conventional techniques; or it may be done in a separate operation if desired. If the inside peripheral edges of either of the separated hoops 32a and 32b are uneven they should be trimmed. If the separating is done by a rolling operation these edges may be trimmed at the same time to make them even, as shown in FIG. 5. Alternatively, they may be trimmed in a separate operation, such as in a press, assuming trimming is even necessary. In addition, the outside peripheral edges of each hoop 32a, 32b should be trimmed, as indicated at broken lines 44a and 44b, respectively, in FIG. 5. This may be done in a roll forming machine, especially if separating is done by rolling, or it may be performed in a press, using standard techniques. At this point there are two substantially identical circular hoops or annular members of generally L-shaped (slightly obtuse) cross-sectional configuration. Since they are essentially the same in shape only the subsequent operations on hoop 32b are described, they being identical to those performed on hoop 32a.

As shown in FIG. 6, the outside diameter or edge of hoop 32b is flanged, as at 46; and as shown in FIG. 7, the inside diameter or edge is flanged, as at 48. These operations may be performed in either order or simultaneously, preferably in a press utilizing conventional techniques. Hoop 32a is then finished, such as by buffing and/or plating, and valve hole 20 pierced.

The next step is to attach wheel locating and retention means 13 to the trim ring. Any one of a number of types of retention may be used, such as those shown in U.S. Pat. Nos. 3,322,468 and 3,432,206; however for illustrative purposes the retention disclosed in U.S. Pat. No. 3,322,468 will be utilized here. As shown in FIG. 8, this retention generally comprises a plurality of circumferentially spaced wheel gripping clips 50 affixed to and between a pair of oppositely disposed annular bands 52 and 54, as more fully disclosed in the aforesaid patent. Retention 13 is affixed to the trim ring by folding flange 42 over bands 52 and 54 to pinch the retention against flange 12. This folding may be accomplished by clinching (knocking over and pressing in a press), rolling (using a roll forming or spinning machine) or curling (using a progressive folding die in a press). At the same time, or in a separate operation if desired, flange 48 is folded over to the position shown in FIG. 8 to create an inner hemmed edge at 16. If the particular retention used requires anchoring at the inside diameter or edge of the trim ring it may be pinched under flange 48, in the same manner as just described with respect to flange 46.

Because the cross-sectional shape of the trim ring will vary for different automobiles and the like, the cross-section of FIGS. 5–8 will vary accordingly. However, it is believed that in almost all trim ring designs the cross-sectional shape of the expanded hoop will be generally T-shaped as generically shown in FIG. 5 (inverted), which shape is intended to encompass a Y-shaped section as specifically shown in FIG. 5 (inverted) and other obvious variations. The generally L-shaped configuration shown in FIGS. 6–8 will also vary accordingly. Also, it should be appreciated that the shape of the cross-section shown in FIG. 5 may vary somewhat in order to accommodate the particular forming technique being used. For example, it may be necessary or desirable to form flanges 38 with a slight draft (upward taper) and/or vary the spacing between them, in accordance with conventional practices.

Thus, there is disclosed in the above description and in the drawings an embodiment of the invention which fully and effectively accomplishes the objects thereof. However, it will be apparent that variations in the method may be indulged in without departing from the sphere of the invention herein described, or the scope of the appended claims.

What is claimed is:

1. A method of fabricating wheel trim for a vehicle wheel, comprising the steps of: forming a strip of raw material into a generally cylindrically-shaped hoop; forming said hoop into an annular shape having a generally T-shaped cross-sectional configuration; separating the hoop into two generally annular members each having a generally L-shaped cross-sectional configuration; and connecting wheel retention means to each of said members.

2. A method as claimed in claim 1, wherein the top of said T-shape is disposed on the inner periphery of said hoop.

3. A method as claimed in claim 1, wherein said hoop is formed into said annular shape by performing an expanding operation.

4. A method as claimed in claim 3, wherein said hoop is expanded by roll forming.

5. A method as claimed in claim 3, wherein said hoop is expanded by bulging in a press.

6. A method as claimed in claim 1, wherein said hoop is formed into said annular shape by roll forming.

7. A method as claimed in claim 1, wherein said generally T-shaped configuration is substantially Y-shaped.

8. A method as claimed in claim 1, wherein said retention means is connected to each said member by folding the outer periphery thereof over said retention means.

9. A method as claimed in claim 1, wherein said hoop is formed into a diameter approximately the inside diameter of the finished wheel trim.

10. A method as claimed in claim 9, wherein the diameter of said hoop is slightly less than the inside diameter of the finished wheel trim.

11. A method as claimed in claim 1, wherein the width of said hoop is approximately the same as twice the developed cross-sectional length of the finished wheel trim.

12. A method as claimed in claim 11, wherein said width is slightly greater than twice said developed length.

13. A method as claimed in claim 1, wherein said hoop is formed by bending a flat strip of raw material into a hoop and welding the ends thereof together.

14. A method as claimed in claim 13, wherein said ends are welded together along a substantially straight seam.

15. A method of fabricating wheel trim for a vehicle wheel, comprising the steps of: forming a strip of raw material into a generally cylindrically-shaped hoop; forming said hoop into an annular shape having a generally Y-shaped cross-sectional configuration; separating the hoop into two generally annular members each having a generally L-shaped cross-sectional configuration; and connecting vehicle wheel retention means to each of said members.

16. A method as claimed in claim 15, wherein said hoop is formed into said annular shape by performing an expanding operation.

17. A method as claimed in claim 16, wherein said hoop is expanded by roll forming.

18. A method as claimed in claim 16, wherein said hoop is expanded by bulging in a press.

19. A method of fabricating wheel trim for a vehicle wheel, comprising the steps of: forming a strip of raw material into a generally cylindrically-shaped hoop; forming said hoop into an annular shape having a cross-sectional configuration comprising two sections each approximating the cross-sectional configuration of the finished wheel trim, the larger diameter portions of said sections being disposed axially inwardly from the edges of said hoop; separating the hoop along a line disposed in a single plane transverse to the axis of said hoop into two generally annular members each having the cross-sectional configuration of one of said sections; and connecting vehicle wheel retention means to each of said members.

20. A method as claimed in claim 19, wherein each said section is generally L-shaped.

21. A method of fabricating a trim ring for a vehicle wheel, said trim ring having a developed cross-sectional length of a given dimension, comprising the steps of: forming a strip of raw material having a width slightly greater than twice said predetermined dimension into a generally cylindrically-shaped hoop having a center axis; welding the ends of said hoop of raw material together to form a continuous, generally cylindrical, circular hoop; expanding said hoop into an annular shape having a cross-sectional configuration including a pair of oppositely directed generally outwardly axially extending first flanges interconnected by a pair of generally parallel radially outwardly extending second flanges joined at their outer edges by a bight portion, said hoop being substantially summetrical about a center plane perpendicular to said center axis and passing through the center of said section; separating said hoop at said center plane into two separate annular members of similar configuration; and assembling wheel retention means to each of said members.

22. A method as claimed in claim 21, further comprising the steps of forming a relatively short axially extending third flange on the outside peripheral edge of each of said members, and folding said third flange over said retention means to secure it to said member.

23. A method as claimed in claim 21, wherein said severing is performed in the same operation as said expanding.

24. A method of fabricating a trim ring for a vehicle wheel, said trim ring having a developed cross-sectional length of a given dimension, comprising the steps of: forming a strip of raw material having a width slightly greater than twice said predetermined dimension into a generally cylindrically-shaped hoop having a center axis; welding the ends of said hoop of raw material together to form a continuous, generally cylindrical, circular hoop; expanding said hoop into an annular shape having a cross-sectional configuration including a pair of oppositely directed generally outwardly axially extending first flanges interconnected by a pair of generally parallel radially outwardly extending second flanges joined at their outer edges by a bight portion, said hoop being substantially symmetrical about a center plane perpendicular to said center axis and passing through the center of said section; separating said hoop at said center plane into two separate annular members of similar configuration; trimming the outer peripheral edge of each said member to render it circular; forming a relatively short axially extending third flange on the outside peripheral edge of each of said members; forming a generally radially outwardly extending fourth flange on the inside peripheral edge of each of said members; assembling wheel retention means to each of said members adjacent said third flange thereon; folding said third flange over said retention means to secure it to said member; and folding said fourth flange toward the outer face of said first flange to provide an inner peripheral hemmed edge.

25. A method as claimed in claim 24, further comprising the step of trimming the edges of said hoop so that they lie in spaced parallel plains, respectively.

26. A method as claimed in claim 24, wherein said trimming is performed on each said member in the same operation as said severing.

27. A method as claimed in claim 24, wherein said third and fourth flanges on each said member are folded over in the same operation.

28. A method as claimed in claim 24, wherein said welding is performed using T.I.G. arc welding.

29. A method as claimed in claim 21, wherein said third flange on each said member extends in the same general direction as said first flange thereon.

30. A method as claimed in claim 21, wherein said fourth flange on each said member extends in the same general direction as said second flange thereon.

31. In a method of fabricating wheel trims for a vehicle wheel, the following steps, forming a strip of raw material into a member having a hooped configuration, attaching the two ends of the hooped member to produce a seam at the attached ends; expanding the hooped member around the perimeter of the member at positions intermediate the opposite axial ends; and separating the hooped member at positions intermediate the opposite axial ends to produce a pair of wheel trims each having a radially extending flange at the end separated from the other wheel trim.

32. In a method as set forth in claim 31, the expansion of the hooped member at the intermediate positions between the opposite axial ends being on a symmetrical basis between the opposite axial ends; and the separation of the hooped member into the pair of wheel trims being on a symmetrical basis between the opposite axial ends.

33. In a method as set forth in claim 32, the step of flanging the edges of each of the wheel trims to provide for retentions by the edges of the wheel trims.

34. In a method as set forth in claim 31, the step of providing retention means on each of the wheel trims.

35. In a method of fabricating wheel trims for a vehicle wheel, the following steps: forming a strip of raw material into a member having an annular configuration attaching the two ends of the annular member to produce a substantially smooth seam at the attached ends; expanding the annular member at the central portions in the cross-sectional configuration thereof; and separating the annular member at a particular position in the central portions in the cross-sectional configuration to produce a pair of wheel trims each having a radially extending outer peripheral flange at the end separated from the other wheel trim.

36. In a method as set forth in claim 35, the step of providing retention means on the flange of each of the wheel trims.

37. In a method as set forth in claim 35, the steps of flanging the outer peripheral flange of each of the trim rings in the pair; and providing retention means on the flanged edge of the outer peripheral flange of each of the trim rings.

38. In a method as set forth in claim 35, the expansion of the annular member at the central portions in the cross-sectional configuration being on a symmetrical basis; and the separation of the annular member into the pair of wheel trims being on a symmetrical basis in the cross-sectional configuration.

* * * * *